United States Patent

Lea et al.

[15] 3,683,476
[45] Aug. 15, 1972

[54] MANUFACTURE OF AIR BEARING ASSEMBLIES

[72] Inventors: Michael C. Lea, Fareham; Ronald J. Wray, Gosport, both of England

[73] Assignee: The Plessey Company Limited, Essex, England

[22] Filed: Aug. 4, 1970

[21] Appl. No.: 60,845

[30] Foreign Application Priority Data

Aug. 7, 1969 Great Britain..........39,503/69

[52] U.S. Cl. ........29/149.5, 29/149.5 A, 29/149.5 B, 29/200 J, 29/434
[51] Int. Cl. .........................B23p 11/00, B23p 19/00
[58] Field of Search .......29/149.5, 149.5 A, 149.5 B, 29/200 J, 434

[56] References Cited

UNITED STATES PATENTS 3,363,300   1/1968   Stec, Sr.................29/149.5 A

Primary Examiner—Thomas H. Eager
Attorney—Mason, Mason & Albright

[57] ABSTRACT

An air bearing is manufactured by coating a member (having the same dimension as the inner bearing member) with an electroless nickel coat. The thickness of the coat is made to equal the final clearance required between the inner and outer bearing members. The coat is then passivated and a layer of metal deposited on one half and, subsequently, on the other half of the coated member. The coated member is then removed from between the two halves of the metal layer which halves are then joined together to form the outer bearing member.

7 Claims, 2 Drawing Figures

PATENTED AUG 15 1972 3,683,476

INVENTORS
Michael C. Lea
Ronald J. Wray
BY
Mason, Mason & Albright
ATTORNEYS

MANUFACTURE OF AIR BEARING ASSEMBLIES

BACKGROUND OF THE INVENTION

The present invention relates to the manufacture of bearing assemblies such as, for example, the manufacture of air bearing assemblies.

SUMMARY OF THE INVENTION

The present invention provides a method of manufacturing a bearing assembly having two relatively movable parts, comprising the steps of coating with a coat of electroless nickel a member of the same size as one part of the bearing assembly, controlling the thickness of the electroless nickel coat so that it substantially equals the eventual bearing clearance required, passivating the coat so that subsequently deposited layers of metal will not adhere to the coat, depositing a layer of metal around the coated member, and removing the coated member from the layer of metal whereby the latter forms the other part of the bearing assembly.

According to the invention, there is further provided a method of making a bearing assembly having inner and outer relatively movable parts, comprising the steps of non-adherently depositing a metallic layer on a former shaped to match the internal shape of the outer part, removing the former, and then substituting the inner part of the bearing assembly, the difference between the outer dimension of the former and the said inner part being equal to the desired bearing clearance.

BRIEF DESCRIPTION OF THE DRAWINGS

A method according to the invention of manufacturing an air bearing assembly for a gyroscope will now be described, by way of example, with reference to the accompanying diagrammatic drawings in which.

DESCRIPTION OF PREFERRED EMBODIMENT

Figure 1:
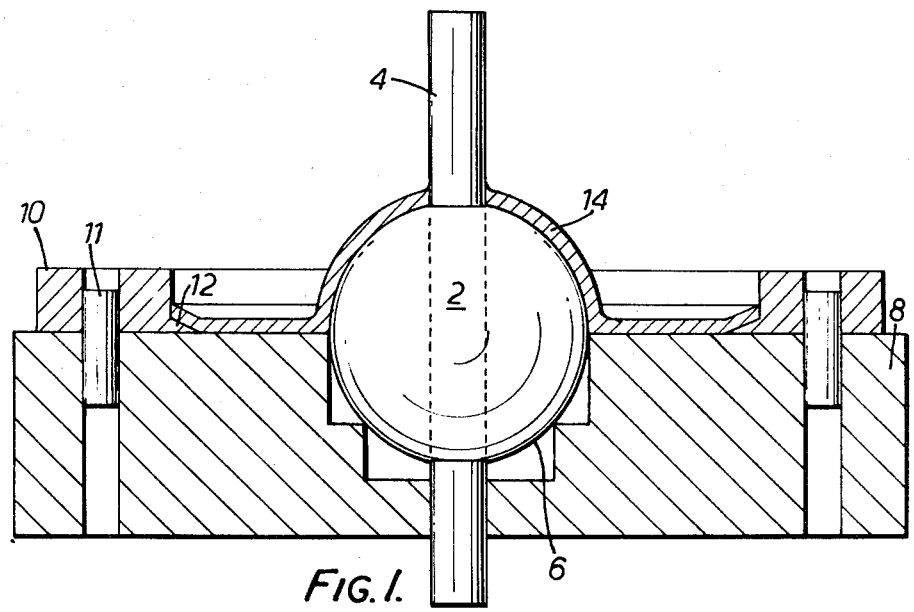
FIG. 1 shows one stage in the manufacture of the air bearing assembly.

A ball former 2 of the same size as a ball to be supported in the air bearing is mounted on a spindle-mandrel 4 and an electroless nickel coating 6 is applied thereto. The thickness of the electroless nickel coating 6 is controlled to be equal to the eventual bearing clearance, and the coating is then passivated (as by heating). The coated ball 2 is then placed in a jig 8, as shown in FIG. 1, so that only one half of the ball 2 projects therefrom. An annular ring 10 is also placed on the jig and positioned by means of dowel pins 11, which pass through complementary holes in both the jig and the ring 10, so that the ring lies coaxial with the spindle-mandrel 4. The annular ring 10 has a radially inwardly extending fillet 12 which rests on the upper surface of the jig 8.

A layer 14 of nickel is then deposited by any suitable depositing process so that the layer of nickel covers the upper half of the ball 2 and also covers the surface of the jig lying between the ball 2 and the fillet 12.

Because the ball 2 has been coated with the passivating coat 6 of electroless nickel, the layer 14 of nickel will not adhere to the coat 6. The surface of the jig 8 which is covered by the layer 14 will also not adhere to the layer 14 because it too has been previously provided with a coat of electroless nickel or some other release agent. The nickel layer 14, however, will have adhered to the fillet 12 of the ring 10 thereby making it integral with the layer 14.

The ball 2, together with the integral layer 14 and ring 10, are then removed from the jig 8 and inverted so that the previously shielded half of the ball lies uppermost. The surface of the layer 14 which was formerly in contact with the jig 8 will thus lie uppermost. The latter surface is then coated with a thin coat of electroless nickel which is passivated (by heating).

A second annular ring 16 similar to the annular ring 10 is then superimposed in the annular ring 10 and located thereon by means of dowel pins. Another layer 18 of nickel is then deposited, again by any known depositing process, so that the layer 18 covers the now-uppermost half of the ball 2 and also the now-uppermost surface of the layer 14. As with the layer 14, the new layer 18 will not adhere to the spindle-mandrel nor to the layer 14 but will adhere to a fillet 20 on the ring 16.

Figure 2:
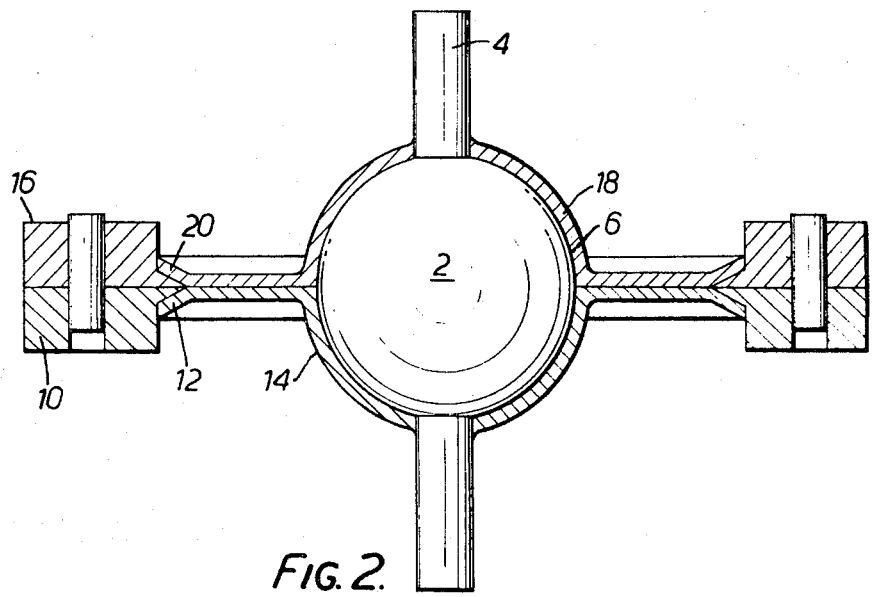
FIG. 2 shows a later stage in the manufacture of the air bearing assembly.

The so-formed assembly, which is shown in FIG. 2, is then provided with bolt holes for bolting the two layers 14 and 18 together, machined and then balanced.

The two halves are then separated and the nickel-coated ball and spindle-mandrel removed and replaced by a ball and spindle-mandrel of the predetermined dimensions, whereupon the two halves are then bolted together to complete the bearing assembly.

In this way, the clearance between the uncoated ball and the bearing is equal to the thickness of the coat 6.

In a modification, instead of using a ball of the same size as the ball to be supported in the air bearing and then giving it the electroless nickel coating 6, an oversize stainless steel ball can be used, the diameter of this oversize ball being the same as that of the ball 2 after its electroless nickel coating. The outer surface of the oversize stainless steel ball is not given a coating corresponding to the coating 6 but is passivated so that deposited nickel layers will not adhere to it and the process hereinbefore described continued with the deposition of the layer 14.

Instead of depositing layers of nickel, layers of other metals can be deposited.

Instead of the electroless nickel coat, another release agent such as graphite powder can be used to prevent the two layers 14 and 18 from adhering together.

We claim:

1. A method of making a bearing assembly having inner and outer relatively movable parts with a desired bearing clearance between them, comprising the steps of non-adherently depositing a metallic layer on a former having a shape which matches the internal shape of the outer part, removing the former, and then substituting the inner part of the bearing assembly whereby the metallic layer forms the outer part of the bearing assembly.

2. A method according to claim 1, wherein the former is made by the step of adherently coating a member similar in size and shape to said inner part until the coated member has the required dimensions of the former.

3. A method according to claim 1, wherein the step of depositing the metallic layer on the former is carried out in two stages, the metallic layer being first deposited on one half of the former and then being deposited over the other half of the former, the two halves of the deposited layer being separable to allow the step of removing the former.

4. A method according to claim 1, including the step of passivating the outer surface of the former prior to the step of depositing the metal layer on the former.

5. A method according to claim 1 and for use where the former is ball-shaped and the outer bearing part is spherical, in which the step of depositing the metallic layer comprises the steps of masking one half of the ball-shaped former so that substantially only the other half of the ball-shaped former is exposed, placing a first annular support member around the ball-shaped former, depositing a first continuous metallic layer on the exposed half of the ball-shaped former and between the ball-shaped former and the support member so that the metallic layer adheres to the support member but does not adhere to the ball-shaped former, unmasking the metal-coated former, placing a second annular support member around the ball-shaped former, depositing a second continuous metallic layer on the said other half of the ball-shaped former and between the ball-shaped former and the second support member so that the metallic layer adheres to the second support member but does not adhere to the ball-shaped former or the previously deposited metallic layer.

6. A method according to claim 5, in which the two support members abut each other and respectively lie on opposite sides of a plane separating the two halves of the ball-shaped former, and including the step of passivating that portion of the first continuous metallic layer which extends between the ball-shaped former and the first support member to prevent adherence thereto of that portion of the second continuous metallic layer which extends between the ball-shaped former and the second support member.

7. Apparatus for making a bearing assembly having inner and outer movable parts, comprising, in combination, a former having a shape which matches the internal shape of the outer part, a jig for supporting the former and which masks one half of the former when it supports the former, a first annular member supported on the jig and extending around the former, metal depositing means for depositing around the exposed half of the former a first layer of metal which extends to join with the annular member but not adhering to the jig and the former, and a second annular member matching the first annular member and supported in superimposed relation with the first annular member after the layer of metal has been joined to the first annular member and after the former has been removed from the jig, said metal depositing means being operative to cover the half of the former which was masked by the jig with a second layer of metal which extends to join with the second annular member but does not adhere to the former or to the first layer of metal.

* * * * *